US012674741B2

(12) United States Patent
Lu et al.

(10) Patent No.: US 12,674,741 B2
(45) Date of Patent: Jul. 7, 2026

(54) SIMULATION EQUIPMENT FOR HOT AND HUMID MARINE ENVIRONMENT AND RADIATION INTENSITY PREDICTION METHOD THEREOF

(71) Applicant: CHINA NATIONAL ELECTRIC APPARATUS RESEARCH INSTITUTE CO., LTD., Guangdong (CN)

(72) Inventors: Tianyi Lu, Guangdong (CN); Shouhe Wang, Guangdong (CN); Chuan Chen, Guangdong (CN); Ganxin Jie, Guangdong (CN); Jun Wang, Guangdong (CN)

(73) Assignee: CHINA NATIONAL ELECTRIC APPARATUS RESEARCH INSTITUTE CO., LTD., Guangdong (CN)

( * ) Notice: Subject to any disclaimer, the term of this patent is extended or adjusted under 35 U.S.C. 154(b) by 332 days.

(21) Appl. No.: 18/602,038

(22) Filed: Mar. 12, 2024

(65) Prior Publication Data

US 2024/0219290 A1    Jul. 4, 2024

Related U.S. Application Data

(63) Continuation of application No. PCT/CN2022/074340, filed on Jan. 27, 2022.

(30) Foreign Application Priority Data

Sep. 17, 2021    (CN) ......................... 202111089762.X

(51) Int. Cl.
*G01N 17/00*        (2006.01)
(52) U.S. Cl.
CPC ................................. *G01N 17/002* (2013.01)

(58) Field of Classification Search
CPC .... G01N 17/00; G01N 17/002; G01N 17/004; G01R 31/003
See application file for complete search history.

(56)                References Cited

U.S. PATENT DOCUMENTS 5,824,918 A  * 10/1998  Zuk ...................... G01N 17/002
                                                        73/147
11,408,816 B2 *  8/2022  Zhang .................. G01N 17/002
                       (Continued)

FOREIGN PATENT DOCUMENTS

CN        207066947        3/2018
CN        207300832 U  *  5/2018
                       (Continued)

OTHER PUBLICATIONS

"International Search Report (Form PCT/ISA/210) of PCT/CN2022/074340", mailed on Jun. 6, 2022, with English translation thereof, pp. 1-6.

*Primary Examiner* — Octavia Hollington
(74) *Attorney, Agent, or Firm* — JCIP GLOBAL INC.

(57)                ABSTRACT

A simulation equipment for hot and humid marine environment and radiation intensity prediction method thereof, which can simultaneously load the working environment factors including voltage, current, temperature, humidity, salt spray, and UV radiation for the tested electrical equipment. The radiation intensity prediction method can predict the UV radiation intensity at the target position of the tested electrical equipment under the influence of different temperature and humidity and salt spray concentration on the attenuation of UV light radiation, so as to accurately obtain the UV radiation intensity $q_r$ at the target position of the tested electrical equipment during material corrosion and aging tests. Moreover, the UV radiation intensity $q_r$ at the target position of the tested electrical equipment can be (Continued)

adjusted to the target UV radiation intensity by correspondingly enhancing or weakening the luminous intensity of each UV fluorescent lamp tube.

7 Claims, 3 Drawing Sheets

(56) References Cited

U.S. PATENT DOCUMENTS

| | | | |
|---|---|---|---|
| 11,878,298 B2 * | 1/2024 | Chen .................... | G01N 1/2273 |
| 2013/0164852 A1 | 6/2013 | Fujii et al. | |
| 2024/0393230 A1 * | 11/2024 | Liu ...................... | G01N 17/002 |

FOREIGN PATENT DOCUMENTS

| | | | | |
|---|---|---|---|---|
| CN | 109164502 | | 1/2019 | |
| CN | 110470591 A | * | 11/2019 | ........... G01N 17/004 |
| CN | 110672503 A | * | 1/2020 | ............. G05D 27/02 |
| CN | 210803228 | | 6/2020 | |
| CN | 111398144 | | 7/2020 | |
| CN | 113515157 | | 10/2021 | |
| CN | 113552056 | | 10/2021 | |

* cited by examiner

SIMULATION EQUIPMENT FOR HOT AND HUMID MARINE ENVIRONMENT AND RADIATION INTENSITY PREDICTION METHOD THEREOF

CROSS-REFERENCE TO RELATED APPLICATION

This application is a continuation of international application of PCT application serial no. PCT/CN2022/074340 filed on Jan. 27, 2022, which claims the priority benefit of China application no. 202111089762.X, filed on Sep. 17, 2021. The entirety of each of the above mentioned patent applications is hereby incorporated by reference herein and made a part of this specification.

BACKGROUND

Technical Field

This disclosure relates to equipment for material corrosion and aging, in particular to a simulation equipment for hot and humid marine environment and radiation intensity prediction method thereof.

Description of Related Art

In hot and humid marine environments, the operating environment of electrical equipment is complex, and the problem of premature failure of electrical products caused by high temperature, high humidity, high radiation, and high salt spray conditions has always existed and even become increasingly serious. However, the existing indoor environmental simulation test equipment is loaded with a single environmental factor, which cannot accurately simulate the impact of various environmental factors in the marine atmospheric environment on the corrosion and aging of electrical equipment. Therefore, it is very important to design and develop a multivariate coupling equipment that simulates humid and hot marine environments, which can achieve synergistic loading of multiple factors such as voltage, current, temperature and humidity, salt spray, and ultraviolet (UV) radiation. To design and develop equipment that can simultaneously load the above environmental factors, it is necessary to answer the mechanism of the influence of different temperature, humidity, and salt spray concentration on the intensity of UV light irradiation. When there is salt spray in the test chamber, after starting the UV light source, UV light irradiation will experience scattering, reflection, absorption, transmission and other phenomena due to the existence of salt spray droplets in the main test chamber, resulting in varying degrees of lower radiation intensity at various positions in the internal space than at the emission point of the light source.

Therefore, it is necessary to establish a three-dimensional spatial radiation intensity prediction model based on the salt spray state inside the main test chamber of the equipment.

SUMMARY

The first technical problem to be solved by the present disclosure is to provide a simulation equipment for hot and humid marine environment.

The technical solution adopted by the present disclosure to solve the above-mentioned technical problems is as follows.

A simulation equipment for hot and humid marine environment, comprises a dry salt spray generation device, a humidifier, a salt spray generation chamber, a main test chamber, and a temperature and humidity regulation system; the dry salt spray generation device is capable of delivering micro-nano scale sodium chloride dry salt particles into the salt spray generation chamber, the humidifier is capable of delivering moist air into the salt spray generation chamber, a centrifugal fan is installed in the salt spray generation chamber, and an outlet of the centrifugal fan is connected to an air inlet of the main test chamber, and the air inlet is located at an upper part of a side wall of the main test chamber; wherein, the preferred dry salt spray generation device is an existing device with the following functions: capable of repeatedly grinding sodium chloride salt particles with general particle sizes firstly, then screening through a filter screen to obtain micro scale to nano scale sodium chloride dry salt particles, and finally sending out the micro-nano scale sodium chloride dry salt particles through a blower.

An interior of the main test chamber is equipped with multiple UV fluorescent lamp tubes and a power interface for supplying power to the tested electrical equipment. Each UV fluorescent lamp tube is located at the upper part of the side wall of the main test chamber, and each UV fluorescent lamp tube is arranged in parallel to each other. The coplanar surface of each UV fluorescent lamp tube is parallel to a bottom surface of the main test chamber. It is necessary to avoid an obstruction of the air inlet caused by the UV fluorescent lamp tubes. The preferred model of the UV fluorescent lamp tubes is UVA-340 nm UV fluorescent lamp.

The temperature and humidity regulation system can monitor and regulate the air temperature and humidity inside the main test chamber.

Therefore, the usage of the simulation equipment for hot and humid marine environment of the present disclosure is as follows.

Firstly, place the tested electrical equipment on the bottom surface of the main test chamber and connect the tested electrical equipment to the power interface, and start the tested electrical equipment to operate inside the main test chamber.

Secondly, the dry salt spray generation device and humidifier respectively feed a certain amount of the micro-nano scale sodium chloride dry salt particles and the moist air into the salt spray generation chamber in a predetermined proportion, in order to mix in the salt spray generation chamber to obtain the salt spray aerosol of expected concentration.

Then, the centrifugal fan introduces the salt spray aerosol in the salt spray generation chamber into the main test chamber through the air inlet. After waiting for a period of time, the salt spray aerosol slowly diffuses and fills an internal space of the entire main test chamber under an action of thermodynamic laws, forming a relatively uniform distribution of salt spray droplet layer. Each drop of salt spray droplets in this salt spray droplet layer is formed by the deliquescence of the micro-nano scale sodium chloride dry salt particles.

Finally, by adjusting a luminous intensity of each UV fluorescent lamp tube, a target position of the tested electrical equipment is adjusted to a required target UV radiation intensity for the test, which can simultaneously load working environment factors including voltage, current, temperature and humidity, salt spray, and UV radiation for the tested electrical equipment, accurately simulating an operating state of the tested electrical equipment in a hot and humid marine environment, to improve an accuracy of material corrosion and aging tests on the tested electrical equipment.

As a preferred embodiment of the present disclosure, the simulation equipment for the hot and humid marine environment further comprises two salt spray concentration monitors, a laser particle sensor, a first light intensity sensor for detecting parallel oriented UV light, and a second light intensity sensor for detecting scattered UV light, which are installed in the main test chamber. The two salt spray concentration monitors are respectively located at a top of the side wall and a bottom of the side wall of the main test chamber. The laser particle sensor is located on a side of the air inlet. The first light intensity sensor and second light intensity sensor are both mounted on an inner top surface of the main test chamber, and the distance between the first light intensity sensor and the coplanar surface of each UV fluorescent lamp tube is within 3 cm. The distance between the second light intensity sensor and the coplanar surface of each UV fluorescent lamp tube is within 3 cm.

Preferably, the simulation equipment for the hot and humid marine environment further comprises an electrical control cabinet, which is electrically connected to the dry salt spray generation device, the humidifier, the temperature and humidity regulation system, the centrifugal fan, the UV fluorescent lamp tubes, the salt spray concentration monitors, the laser particle sensor, the first light intensity sensor, and the second light intensity sensor, to control the operation of the simulation equipment for the hot and humid marine environment, and can be used to run the following radiation intensity prediction method.

Preferably, the salt spray generation chamber and the main test chamber are equipped with sealing doors that can be opened and closed to facilitate the placement of the tested electrical equipment and cleaning.

Preferably, a bottom of the main test chamber is equipped with an air outlet and a drainage outlet for discharging the settling salt solution.

The second technical problem to be solved by the present disclosure is to provide a radiation intensity prediction method for a hot and humid marine environment simulation equipment.

The technical solution adopted by the present disclosure to solve the above-mentioned technical problems is as follows.

A radiation intensity prediction method for a hot and humid marine environment simulation equipment, wherein it is implemented based on the simulation equipment for the hot and humid marine environment, comprises:

Step S1, after a difference in salt spray concentration values measured by the two salt spray concentration monitors is within 10%, indicating that a relatively uniform distribution of salt spray droplets has been formed in the internal space of the main test chamber, measure an air temperature T (C°) and a relative humidity RH (%) inside the main test chamber by the temperature and humidity regulation system; measure a size distribution data of salt spray droplets by the laser particle sensor within a sensing range, the size distribution data of the salt spray droplets includes a number of the salt spray droplets $N_i$ within a radius range of an i-th salt spray droplet in the radius of the sensing range, $1 \leq i \leq K$, K is a positive integer, wherein a number of salt spray droplet radius range K and a range value of each salt spray droplet radius range are determined by the model of the laser particle sensor used; measure a parallel UV light intensity $$I_{inc}^{dir}$$

by the first light intensity sensor, and measure a scattered UV light intensity $$I_{inc}^{dir}$$

by the second light intensity sensor.

Step S2, according to thermodynamic laws, a concentration and a droplet size of an electrolyte produced by salt hydrolysis will change under the influence of temperature and humidity, and have the following characteristics:

First, micro droplets formed by deliquescence start from salt crystallization, and a radius of the formed droplets (liquid film volume) mainly depends on the relative humidity and mass of salt particles.

Second, a concentration of salt solution formed by deliquescence decreases with the increase of the relative humidity, forming a linear relationship.

Based on the above two characteristics, conversion calculations can be performed, including:

Step S2-1, based on the thermodynamic properties of salt, calculate a volume fraction $f_v$ of the salt spray droplets occupying the internal space of the main test chamber at the air temperature T and the relative humidity RH using the following formulas:

$$C_{NaCl} = 2.37 \times 10^{-4} T \cdot RH - 0.2237 RH - 0.0237 T + 22.37,$$

in this formula, $C_{NaCl}$ is a concentration of the salt spray droplets (kmol·m$^{-3}$), RH$\in$[RH$_{sat}$, 100);

RH$_{sat}$=−0.0327T+76.049, in this formula, RH$_{sat}$ is a relative humidity (%) of sodium chloride saturated deliquescence;

$$f_v = \frac{m}{M_{NaCl}C_{NaCl}} \times 100\%,$$

in this formula, m is an average of the salt spray concentration values measured by the two salt spray concentration monitors (ug/m$^3$), and $M_{NaCl}$ is a molar mass of NaCl at 58.5 g/mol.

Step S2-2: based on the size distribution data of the salt spray droplets measured by the laser particle sensor, calculate an average radius of the salt spray droplets $\bar{a}$:

$$\bar{a} = \frac{\sum_1^K R_i \times N_i}{\sum_1^K N_i},$$

in this formula, $R_i$ is a median of the radius range of the i-th salt spray droplet.

For example, a certain model of laser particle sensor can detect salt spray droplets with a radius range of K=3, ranging from 0.1-1 μm、1-2 μm and 2-5 μm. That is to say, the median $R_i$ within the radius range of the three salt spray droplets were 0.55 μm, 1.5 μm and 3.5 μm in sequence. The laser particle sensor measured the number of salt spray droplets $N_i$ corresponding to the radius range of the three salt spray droplets in Step S1, which were 100, 50, and 30 respectively. Therefore, the average radius of the salt spray droplets can be calculated as $$\bar{a} = \frac{0.55*100 + 1.5*50 + 3.5*30}{180} = 1.3 \ \mu m.$$

Step S3, based on Mie scattering theory and radiation transfer equation, calculate an UV radiation intensity $q_t$ at the target position of the tested electrical equipment, wherein the tested electrical equipment is placed on the bottom surface of the main test chamber.

Step S3-1, calculate a transmission scattering coefficient $$\sigma_\lambda^{tr} = \frac{0.75 f_v Q_s^{tr}}{\bar{a}},$$

in this formula, $$Q_s^{tr}$$

represents a scattering transmission efficiency factor, when $$\bar{a} \leq 1 \ \mu m, Q_s^{tr} = 0.37,$$

when $$1 \ \mu m < \bar{a} < 3 \ \mu m, Q_s^{tr} = 0.35,$$

when $$3 \ \mu m \leq \bar{a} < 5 \ \mu m, Q_s^{tr} = 0.32,$$

when $$\bar{a} \geq 5 \ \mu m, Q_s^{tr} = 0.3.$$

The calculation of step S3-1 is based on the following ideas.

When irradiation passes through the salt spray droplet layer, absorption and penetration phenomena mainly occur. Throughout the process, because a distance between salt spray particles is much greater than their diameter, and an average diameter is around 1-25 μm, scattering effects of the salt spray droplets on irradiation are independent of each other. That is, the independent scattering theory is applicable. In a single size droplet dispersion system, a absorption coefficient $\alpha_\lambda$ and a transmission scattering coefficient $$\sigma_\lambda^{tr}$$

6 can be calculated using the following formula:

$$\alpha_\lambda = \frac{0.75 f_v Q_a}{a},$$

$$\sigma_\lambda^{tr} = \frac{0.75 f_v Q_s^{tr}}{a},$$

wherein $f_v$ is the volume fraction of the salt spray droplets, a is a droplet radius, when the values of droplet radius a are different, it can be replaced by the average radius of salt spray droplets $\bar{a}$. The dimensionless quantities $Q_a$ and $$Q_s^{tr}$$

are respectively the absorption efficiency factor and scattering transmission efficiency factor, calculated with Mie scattering theory. For fixed size salt spray droplets, these two values are functions of wavelength variation.

In an UV band ($\lambda$=0.28-0.4 μm), when a diffraction parameter of droplets x=2πa/λ>>1, compared with the scattering transmission efficiency factor $$Q_s^{tr},$$

the absorption efficiency factor $Q_a$ is very small, and an absorption of UV light by droplets is very weak, with the absorption coefficient $\alpha_\lambda$ very small, which is negligible.

In the UV band ($\lambda$=0.28-0.4 μm), when the droplet is very small, such as a<5 μm, a value of the scattering transmission efficiency factor $$Q_s^{tr}$$

is calculated according to Mie scattering theory, with a range of values from 0.365 to 0.37; when a≥5 μm, the scattering transmission efficiency factor can be approximated as a constant $$Q_s^{tr} = 0.3.$$

Step S3-2, calculate the UV radiation intensity $q_t$ at the target position of the tested electrical equipment according to the following formula, $$q_t = I_{inc}^{dir} T_{dir-h} + I_{inc}^{dif} T_{dif-h}.$$

In the formula, $$I_{inc}^{dir} T_{dir-h} \text{ and } I_{inc}^{dif} T_{dif-h}$$

respectively represent a radiation intensity of the parallel oriented UV light and the scattered UV light generated by each UV fluorescent lamp tube after passing through the salt spray droplet layer and acting on the target position.

The absorption coefficient $\alpha_\lambda$ of the salt spray droplets for UV light is very small and negligible, in the case of a uniform salt spray medium layer, obtain $T_{dir-h}$ and $T_{dif-h}$ with the radiation transfer equation:

$$T_{dir-h} = \mu_i \frac{\mu_i(1 - E_{tr}) + (1 + E_{tr})/2}{1 + \tau_{tr}^o},$$

$$T_{dif-h} = \frac{1}{1 + \tau_{tr}^o},$$

$$\tau_{tr}^o = \beta_{tr}d = (\alpha_\lambda + \sigma_\lambda^{tr})d,$$

$$E_{tr} = \exp(-\tau_{tr}^o/\mu_i).$$

In the formulas, $T_{dir-h}$ and $T_{dif-h}$ respectively represent a directional hemispherical transmittance and a hemispherical diffusion transmittance, $\alpha_\lambda$ is an incidence angle of the parallel UV light on the salt spray droplet layer, and $\alpha_\lambda$ is $0°$, $\mu_i$ is a cosine value of the incident angle $\alpha_\lambda$, $$\tau_{tr}^o$$

is a total optical thickness of the salt spray droplet layer, d is a distance between the target position of the tested electrical equipment and the coplanar surface of each UV fluorescent lamp tube, which is the thickness of the salt spray droplet layer where parallel UV light passes through the salt spray droplet layer to reach the target position, this distance d can be measured by a ruler, a scale engraved on the main test chamber, or other methods, $\beta_{tr}$ represents an extinction coefficient, and $E_{tr}$ is an intermediate parameter.

As shown in FIG. 3, four sets of measured data respectively represent the UV radiation intensity $q_t$ generated at the target position of the tested electrical equipment when the UV light passes through the salt spray droplet layers with different average radius of salt spray droplets $\bar{a}$ at the distances d of 0.2 m, 0.4 m, 0.6 m, and 0.7 m.

Preferably, the irradiation intensity prediction method further comprises Step S4.

Step S4, based on the difference between the UV radiation intensity $q_t$ calculated in step S3 and the target UV radiation intensity, adjust the UV radiation intensity $q_t$ at the target position of the tested electrical equipment to the target UV radiation intensity by correspondingly enhancing or weakening a luminous intensity of each UV fluorescent lamp tube.

Compared with prior art, the present disclosure has the following advantages.

1. Firstly, the simulation equipment for the hot and humid marine environment of the present disclosure can simultaneously load the working environment factors including voltage, current, temperature, humidity, salt spray, and UV radiation for the tested electrical equipment, accurately simulating the operating state of the tested electrical equipment in the hot and humid marine environment, in order to improve the accuracy of material corrosion and aging tests on the tested electrical equipment.

2. Secondly, the radiation intensity prediction method of the present disclosure can predict the UV radiation intensity at the target position of the tested electrical equipment under the influence of different temperature and humidity and salt spray concentration on the attenuation of UV light radiation, so as to accurately obtain the UV radiation intensity $q_t$ at the target position of the tested electrical equipment during material corrosion and aging tests. Moreover, based on the difference between the calculated UV radiation intensity $q_t$ and the target UV radiation intensity, the disclosure can adjust the UV radiation intensity $q_t$ at the target position of the tested electrical equipment to the target UV radiation intensity by correspondingly enhancing or weakening the luminous intensity of each UV fluorescent lamp tube, in order to facilitate the conduct of material corrosion and aging tests.

DETAILED DESCRIPTION OF DISCLOSED EMBODIMENTS

The following will provide a detailed explanation of the technical solution of the disclosure in conjunction with the embodiments and accompanying figures, in order for those skilled in the art to better understand and implement the technical solution of the disclosure. However, the scope of protection of the claims of the present disclosure is not limited to the following embodiments. For those skilled in the art, all other embodiments obtained without creative labor, without departing from the inventive concept of the present disclosure, belong to the scope of protection of the present disclosure.

Embodiment 1

Figure 1:
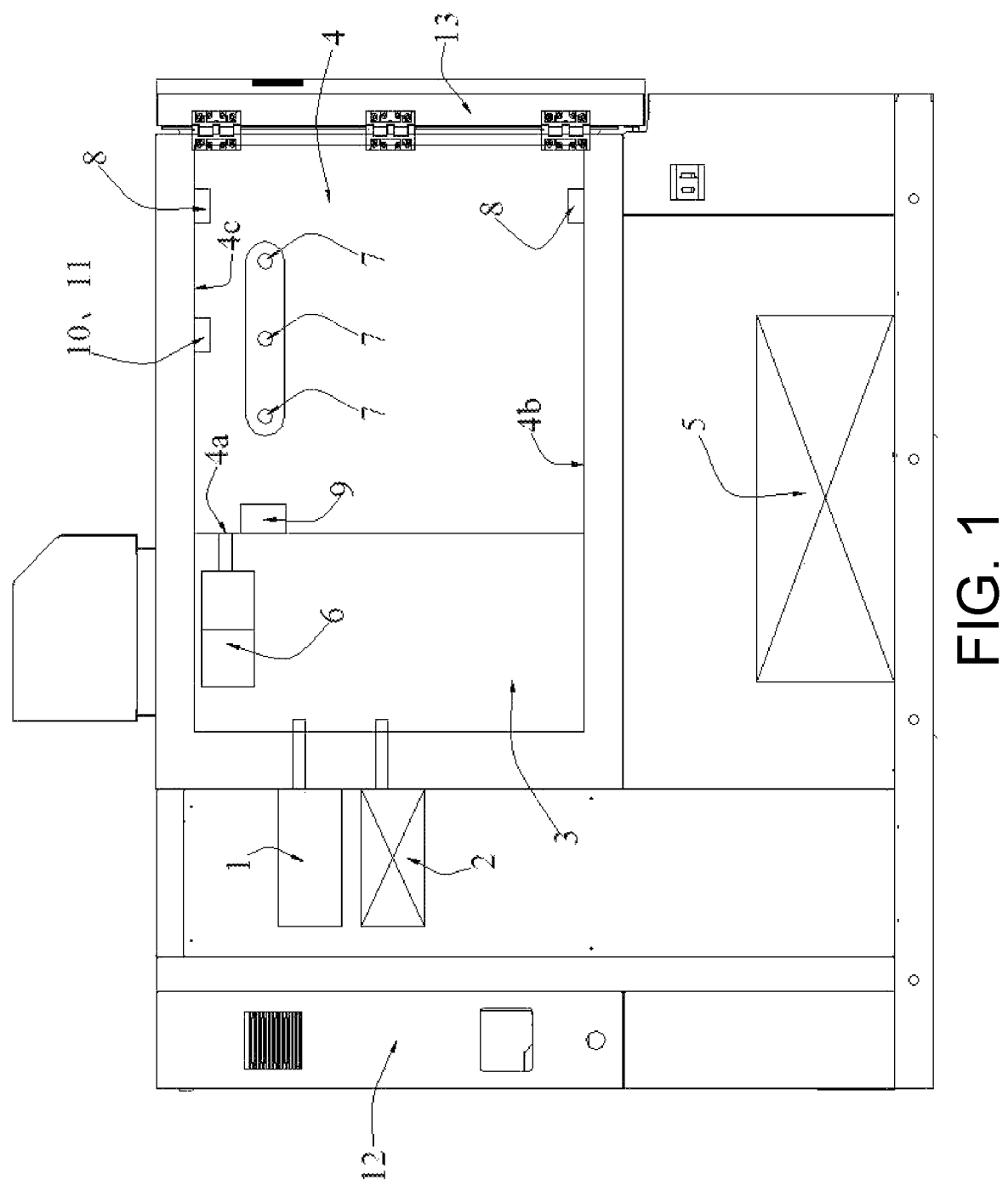
FIG. 1 is a schematic diagram of the structure of the simulation equipment for hot and humid marine environment.
Figure 2:
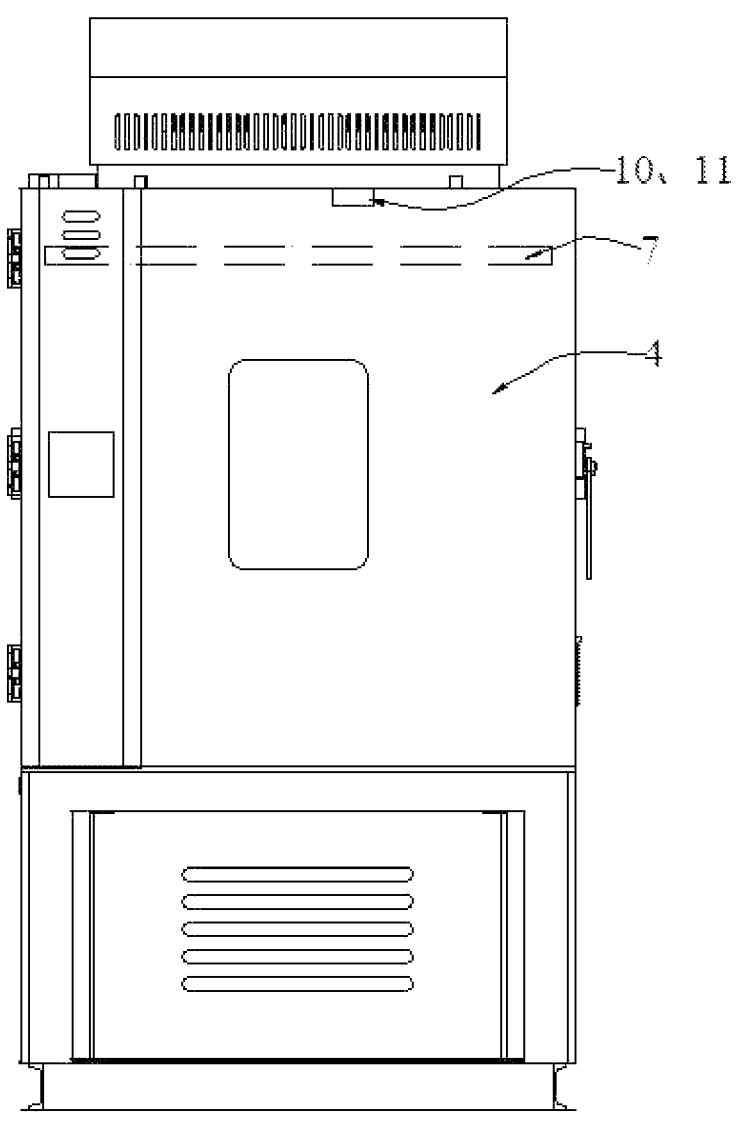
FIG. 2 shows the right side view with perspective effect in FIG. 1.

As shown in FIG. 1 and FIG. 2, the simulation equipment for hot and humid marine environment of the present disclosure, comprises a dry salt spray generation device 1, a humidifier 2, a salt spray generation chamber 3, a main test chamber 4, and a temperature and humidity regulation system 5.

The dry salt spray generation device 1 is capable of delivering micro-nano scale sodium chloride dry salt particles into the salt spray generation chamber 3. The humidifier 2 is capable of delivering moist air into the salt spray generation chamber 3. A centrifugal fan 6 is installed in the salt spray generation chamber 3, and the outlet of the centrifugal fan 6 is connected to the air inlet 4a of the main test chamber 4. The air inlet 4a is located at the upper part of the side wall of the main test chamber 4. Wherein, the preferred dry salt spray generation device 1 is an existing device with the following functions: capable of repeatedly grinding sodium chloride salt particles with general particle sizes firstly, then screening through a filter screen to obtain micro scale to nano scale sodium chloride dry salt particles, and finally sending out the micro-nano scale sodium chloride dry salt particles through a blower.

The interior of the main test chamber 4 is equipped with multiple UV fluorescent lamp tubes 7 and a power interface for supplying power to the tested electrical equipment. Each UV fluorescent lamp tube 7 is located at the upper part of the side wall of the main test chamber 4, and each UV fluorescent lamp tube 7 is arranged in parallel to each other. The coplanar surface of each UV fluorescent lamp tube 7 is parallel to the bottom surface 4b of the main test chamber 4. It is necessary to avoid the obstruction of the air inlet 4a caused by the UV fluorescent lamp tubes 7. The preferred model of the UV fluorescent lamp tubes 7 is UVA-340 nm UV fluorescent lamp.

The temperature and humidity regulation system 5 can monitor and regulate the air temperature and humidity inside the main test chamber 4.

Therefore, the usage of the simulation equipment for hot and humid marine environment of the present disclosure is as follows.

Firstly, place the tested electrical equipment on the bottom surface 4b of the main test chamber 4 and connect the tested electrical equipment to the power interface, and start the tested electrical equipment to operate inside the main test chamber 4.

Secondly, the dry salt spray generation device 1 and humidifier 2 respectively feed a certain amount of the micro-nano scale sodium chloride dry salt particles and the moist air into the salt spray generation chamber 3 in a predetermined proportion, in order to mix in the salt spray generation chamber 3 to obtain the salt spray aerosol of expected concentration.

Then, the centrifugal fan 6 introduces the salt spray aerosol in the salt spray generation chamber 3 into the main test chamber 4 through the air inlet 4a. After waiting for a period of time, the salt spray aerosol slowly diffuses and fills the internal space of the entire main test chamber 4 under the action of thermodynamic laws, forming a relatively uniform distribution of salt spray droplet layer. Each drop of salt spray droplets in this salt spray droplet layer is formed by the deliquescence of the micro-nano scale sodium chloride dry salt particles.

Finally, by adjusting the luminous intensity of each UV fluorescent lamp tube 7, the target position of the tested electrical equipment is adjusted to the required target UV radiation intensity for the test, which can simultaneously load the working environment factors including voltage, current, temperature and humidity, salt spray, and UV radiation for the tested electrical equipment, accurately simulating the operating state of the tested electrical equipment in a hot and humid marine environment, to improve the accuracy of material corrosion and aging tests on the tested electrical equipment.

Embodiment 2

On the basis of the above Embodiment 1, Embodiment 2 further adopts the following preferred embodiment.

The simulation equipment for hot and humid marine environment further comprises two salt spray concentration monitors 8, a laser particle sensor 9, a first light intensity sensor 10 for detecting parallel oriented UV light, and a second light intensity sensor 11 for detecting scattered UV light, which are installed in the main test chamber 4. The two salt spray concentration monitors 8 are respectively located at the top of the side wall and a bottom of the side wall of the main test chamber 4. The laser particle sensor 9 is located on the side of the air inlet 4a. The first light intensity sensor 10 and the second light intensity sensor 11 are both mounted on the inner top surface 4c of the main test chamber 4, and the distance between the first light intensity sensor 10 and the coplanar surface of each UV fluorescent lamp tube 7 is within 3 cm. The distance between the second light intensity sensor 11 and the coplanar surface of each UV fluorescent lamp tube 7 is within 3 cm.

The above is the basic embodiment of this Embodiment 2, which can be further optimized, improved and defined on the basis of this basic embodiment.

Preferably, the simulation equipment for the hot and humid marine environment further comprises an electrical control cabinet 12, which is electrically connected to the dry salt spray generation device 1, the humidifier 2, the temperature and humidity regulation system 5, the centrifugal fan 6, the UV fluorescent lamp tubes 7, the salt spray concentration monitors 8, the laser particle sensor 9, the first light intensity sensor 10, and the second light intensity sensor 11, to control the operation of the simulation equipment for the hot and humid marine environment, and can be used to run the following radiation intensity prediction method.

Preferably, the salt spray generation chamber 3 and the main test chamber 4 are equipped with sealing doors 13 that can be opened and closed to facilitate the placement of the tested electrical equipment and cleaning.

Preferably, the bottom of the main test chamber 4 is equipped with an air outlet and a drainage outlet for discharging the settling salt solution.

Embodiment 3

Embodiment 3 discloses a radiation intensity prediction method for a hot and humid marine environment simulation equipment, which is implemented based on the simulation equipment for the hot and humid marine environment described in Embodiment 2, comprises:

Step S1, after the difference in salt spray concentration values measured by the two salt spray concentration monitors 8 is within 10%, indicating that a relatively uniform distribution of salt spray droplets has been formed in the internal space of the main test chamber 4, measure the air temperature T (C°) and the relative humidity RH (%) inside the main test chamber 4 by the temperature and humidity regulation system 5; measure the size distribution data of salt spray droplets by the laser particle sensor 9 within the sensing range, the size distribution data of the salt spray droplets includes the number of the salt spray droplets $N_i$ within the radius range of the i-th salt spray droplet in the radius of the sensing range, $1 \leq i \leq K$, K is a positive integer, wherein the number of salt spray droplet radius range K and the range value of each salt spray droplet radius range are determined by the model of the laser particle sensor 9 used; measure the parallel UV light intensity $$I_{inc}^{dir}$$

by the first light intensity sensor 10, and measure the scattered UV light intensity $$I_{inc}^{dir}$$

by the second light intensity sensor 11.

Step S2, according to thermodynamic laws, the concentration and the droplet size of the electrolyte produced by salt hydrolysis will change under the influence of temperature and humidity, and have the following characteristics.

First, the micro droplets formed by deliquescence start from salt crystallization, and the radius of the formed droplets (liquid film volume) mainly depends on the relative humidity and the mass of salt particles.

Second, the concentration of salt solution formed by deliquescence decreases with the increase of the relative humidity, forming a linear relationship.

Based on the above two characteristics, conversion calculations can be performed, including:

Step S2-1, based on the thermodynamic properties of salt, calculate the volume fraction $f_v$ of the salt spray droplets occupying the internal space of the main test chamber 4 at the air temperature T and the relative humidity RH using the following formulas:

$$C_{NaCl} = 2.37 \times 10^{-4} T \cdot RH - 0.2237 RH - 0.0237 T + 22.37,$$

in this formula, $C_{NaCl}$ is the concentration of the salt spray droplets (kmol·m$^{-3}$), RH∈[RH$_{sat}$, 100);

RH$_{sat}$=−0.0327T+76.049, in this formula, RH$_{sat}$ is the relative humidity (%) of sodium chloride saturated deliquescence;

$$f_v = \frac{m}{M_{NaCl}C_{NaCl}} \times 100\%,$$

in this formula, m is the average of the salt spray concentration values measured by the two salt spray concentration monitors (ug/m$^3$), and $M_{NaCl}$ is the molar mass of NaCl at 58.5 g/mol.

Step S2-2: based on the size distribution data of the salt spray droplets measured by the laser particle sensor, calculate the average radius of the salt spray droplets $\bar{a}$:

$$\bar{a} = \frac{\sum_1^K R_i \times N_i}{\sum_1^K N_i},$$

in this formula, $R_i$ is the median of the radius range of the i-th salt spray droplet.

For example, a certain model of laser particle sensor 9 can detect salt spray droplets with a radius range of K=3, ranging from 0.1-1 μm、1-2 μm and 2-5 μm. That is to say, the median $R_i$ within the radius range of the three salt spray droplets were 0.55 μm, 1.5 μm and 3.5 μm in sequence. The laser particle sensor 9 measured the number of salt spray droplets $N_i$ corresponding to the radius range of the three salt spray droplets in Step S1, which were 100, 50, and 30 respectively. Therefore, the average radius of the salt spray droplets can be calculated as $$\bar{a} = \frac{0.55*100 + 1.5*50 + 3.5*30}{180} = 1.3 \ \mu m.$$

Step S3, based on Mie scattering theory and radiation transfer equation, calculate the UV radiation intensity $q_t$ at the target position of the tested electrical equipment, wherein the tested electrical equipment is placed on the bottom surface 4b of the main test chamber 4.

Step S3-1, calculate the transmission scattering coefficient $$\sigma_\lambda^{tr} = \frac{0.75 f_v Q_s^{tr}}{\bar{a}},$$

in this formula, $$Q_s^{tr}$$

represents the scattering transmission efficiency factor, when $$\bar{a} \le 1 \ \mu m, Q_s^{tr} = 0.37,$$

when $$1 \ \mu m < 3 \ \mu m, Q_s^{tr} = 0.35, \text{ when } 3 \ \mu m \le \bar{a} < 5 \ \mu m,$$

$$Q_s^{tr} = 0.32, \text{ when } \bar{a} \ge 5 \ \mu m,$$

$$Q_s^{tr} = 0.3.$$

The calculation of step S3-1 is based on the following ideas.

When irradiation passes through the salt spray droplet layer, absorption and penetration phenomena mainly occur. Throughout the process, because the distance between salt spray particles is much greater than their diameter, and the average diameter is around 1-25 μm, the scattering effects of salt spray droplets on irradiation are independent of each other. That is, the independent scattering theory is applicable. In a single size droplet dispersion system, the absorption coefficient $\alpha_\lambda$ and the transmission scattering coefficient $$\sigma_\lambda^{tr}$$

can be calculated using the following formula, $$\alpha_\lambda = \frac{0.75 f_v Q_a}{a},$$

$$\sigma_\lambda^{tr} = \frac{0.75 f_v Q_s^{tr}}{a},$$

wherein $f_v$ is the volume fraction of the salt spray droplets, a is the droplet radius, when the values of droplet radius a are different, it can be replaced by the average radius of salt spray droplets $\bar{a}$. The dimensionless quantities $Q_a$ and $$Q_s^{tr}$$

are respectively the absorption efficiency factor and scattering transmission efficiency factor, calculated with Mie scattering theory. For fixed size salt spray droplets, these two values are functions of wavelength variation.

In the UV band (λ=0.28-0.4 μm), when the diffraction parameter of droplets x=2πa/λ>>1, compared with the scattering transmission efficiency factor $Q_s^{tr}$, the absorption efficiency factor $Q_a$ is very small, and the absorption of UV light by droplets is very weak, with the absorption coefficient $\alpha_\lambda$ very small, which is negligible.

In the UV band ($\lambda$=0.28-0.4 μm), when the droplet is very small, such as a<5 μm, the value of the scattering transmission efficiency factor $Q_s^{tr}$ is calculated according to Mie scattering theory, with a range of values from 0.365 to 0.37; when a≥5 μm, the scattering transmission efficiency factor can be approximated as a constant $Q_s^{tr} = 0.3$.

Step S3-2, calculate the UV radiation intensity $q_t$ at the target position of the tested electrical equipment according to the following formula, $q_t = I_{inc}^{dir} T_{dir-h} + I_{inc}^{dir} T_{dir-h}$.

In the formula, $I_{inc}^{dir} T_{dir-h}$ and $I_{inc}^{dir} T_{dir-h}$ respectively represent the radiation intensity of the parallel oriented UV light and the scattered UV light generated by each UV fluorescent lamp tube 7 after passing through the salt spray droplet layer and acting on the target position.

The absorption coefficient $\alpha_\lambda$ of the salt spray droplets for UV light is very small and negligible, in the case of a uniform salt spray medium layer, obtain $T_{dir-h}$ and $T_{dif-h}$ with the radiation transfer equation.

$T_{dir-h} = \mu_i \dfrac{\mu_i(1 - E_{tr}) + (1 + E_{tr})/2}{1 + \tau_{tr}^o}$, $T_{dif-h} = \dfrac{1}{1 + \tau_{tr}^o}$, $\tau_{tr}^o = \beta_{tr} d = (\alpha_\lambda + \sigma_\lambda^{tr})d$, $E_{tr} = \exp(-\tau_{tr}^o/\mu_i)$.

In the formulas, $T_{dir-h}$ and $T_{dif-h}$ respectively represent the directional hemispherical transmittance and the hemispherical diffusion transmittance, $\alpha_\lambda$ is the incidence angle of the parallel UV light on the salt spray droplet layer, and $\alpha_\lambda$ is 0°, $\mu_i$ is the cosine value of the incident angle $\alpha_\lambda$, $\tau_{tr}^o$ is the total optical thickness of the salt spray droplet layer, d is the distance between the target position of the tested electrical equipment and the coplanar surface of each UV fluorescent lamp tube 7, which is the thickness of the salt spray droplet layer where parallel UV light passes through the salt spray droplet layer to reach the target position, this distance d can be measured by a ruler, a scale engraved on the main test chamber 4, or other methods, $\beta_{tr}$ represents the extinction coefficient, and $E_{tr}$ is an intermediate parameter.

Figure 3:
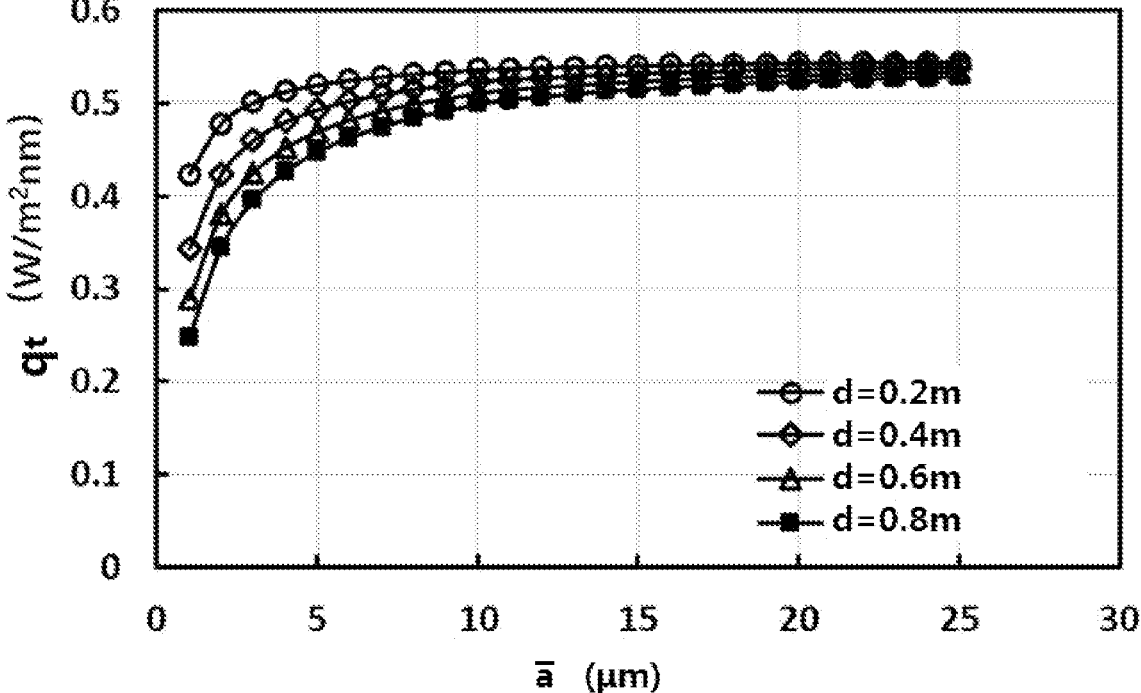
FIG. 3 is a schematic diagram of the four sets of measured data of the average radius of salt spray droplets $\bar{a}$ and the UV radiation intensity $q_t$.

As shown in FIG. 3, four sets of measured data respectively represent the UV radiation intensity $q_t$ generated at the target position of the tested electrical equipment when the UV light passes through the salt spray droplet layers with different average radius of salt spray droplets $\bar{a}$ at the distances d of 0.2 m, 0.4 m, 0.6 m, and 0.7 m.

The above is the basic embodiment of this Embodiment 3, which can be further optimized, improved and defined on the basis of this basic embodiment.

Preferably, the irradiation intensity prediction method further comprises Step S4.

Step S4, based on the difference between the UV radiation intensity $q_t$ calculated in step S3 and the target UV radiation intensity, adjust the UV radiation intensity $q_t$ at the target position of the tested electrical equipment to the target UV radiation intensity by correspondingly enhancing or weakening the luminous intensity of each UV fluorescent lamp tube 7.

The present disclosure is not limited to the specific embodiments mentioned above. Based on the above content, according to the common technical knowledge and customary means in the field, without departing from the basic technical ideas of the present disclosure, the present disclosure can also make various other forms of equivalent modifications, substitutions or changes, all of which fall within the scope of protection of the present disclosure.

What is claimed is:

1. A simulation equipment for a hot and humid marine environment, comprising a dry salt spray generation device, a humidifier, a salt spray generation chamber, a main test chamber, and a temperature and humidity regulation system, the dry salt spray generation device is capable of delivering micro-nano scale sodium chloride dry salt particles into the salt spray generation chamber, the humidifier is capable of delivering moist air into the salt spray generation chamber, a centrifugal fan is installed in the salt spray generation chamber, and an outlet of the centrifugal fan is connected to an air inlet of the main test chamber, and the air inlet is located at an upper part of a side wall of the main test chamber;

an interior of the main test chamber is equipped with multiple UV fluorescent lamp tubes and a power interface for supplying power to a tested electrical equipment, each UV fluorescent lamp tube is located at the upper part of the side wall of the main test chamber, and each UV fluorescent lamp tube is arranged in parallel to each other, and a coplanar surface of each UV fluorescent lamp tube is parallel to a bottom surface of the main test chamber;

the temperature and humidity regulation system can monitor and regulate the air temperature and humidity inside the main test chamber.

2. The simulation equipment for the hot and humid marine environment according to claim 1, further comprising two salt spray concentration monitors, a laser particle sensor, a first light intensity sensor for detecting parallel oriented UV light, and a second light intensity sensor for detecting scattered UV light, which are installed in the main test chamber; the two salt spray concentration monitors are respectively located at a top of the side wall of the main test chamber and a bottom of the side wall of the main test chamber, the laser particle sensor is located on a side of the air inlet, the first light intensity sensor and the second light intensity sensor are both mounted on an inner top surface of the main test chamber, a distance between the first light intensity sensor and the coplanar surface of each UV fluorescent lamp tube is within 3 cm, and a distance between the second light intensity sensor and the coplanar surface of each UV fluorescent lamp tube is within 3 cm.

3. The simulation equipment for the hot and humid marine environment according to claim 2, further comprising an electrical control cabinet, which is electrically connected to the dry salt spray generation device, the humidifier, the temperature and humidity regulation system, the centrifugal fan, the UV fluorescent lamp tubes, the salt spray concentration monitors, the laser particle sensor, the first light intensity sensor, and the second light intensity sensor.

4. The simulation equipment for the hot and humid marine environment according to claim 3, wherein the salt spray generation chamber and the main test chamber are equipped with sealing doors that can be opened and closed.

5. The simulation equipment for the hot and humid marine environment according to claim 2, wherein a bottom of the main test chamber is equipped with an air outlet and a drainage outlet.

6. A radiation intensity prediction method for a hot and humid marine environment simulation equipment, wherein it is implemented based on the simulation equipment for the hot and humid marine environment according to claim 2, comprising:

Step S1, after a difference in salt spray concentration values measured by the two salt spray concentration monitors is within 10%, measuring an air temperature T and a relative humidity RH inside the main test chamber by the temperature and humidity regulation system; measuring a size distribution data of salt spray droplets by the laser particle sensor within a sensing range, the size distribution data of the salt spray droplets includes a number of the salt spray droplets $N_i$ within a radius range of an i-th salt spray droplet in a radius of the sensing range, $1 \leq i \leq K$, K is a positive integer; measuring a parallel UV light intensity $$I_{inc}^{dir}$$

by the first light intensity sensor, and measuring a scattered UV light intensity $$I_{inc}^{dir}$$

by the second light intensity sensor;

Step S2, performing conversion calculations, comprising:
Step S2-1, calculating a volume fraction $f_v$ of the salt spray droplets occupying the internal space of the main test chamber at the air temperature T and relative humidity RH using the following formulas:

$$C_{NaCl} = 2.37 \times 10^{-4} T \cdot RH - 0.2237 RH - 0.0237 T + 22.37,$$

in this formula, $C_{NaCl}$ is a concentration of the salt spray droplets, $RH \in [RH_{sat}, 100)$;
$RH_{sat} = -0.0327T + 76.049$, in this formula, $RH_{sat}$ is a relative humidity of sodium chloride saturated deliquescence;

$$f_v = \frac{m}{M_{NaCl} N_{NaCl}} \times 100\%,$$

in this formula, m is an average of the salt spray concentration values measured by the two salt spray concentration monitors, and $M_{NaCl}$ is a molar mass of NaCl at 58.5 g/mol;

Step S2-2: based on the size distribution data of the salt spray droplets measured by the laser particle sensor, calculating an average radius of the salt spray droplets $\bar{a}$:

$$\bar{a} = \frac{\sum_1^K R_i \times N_i}{\sum_1^K N_i},$$

in this formula, $R_i$ is a median of the radius range of the i-th salt spray droplet;

Step S3, calculating an UV radiation intensity $q_t$ at a target position of the tested electrical equipment, wherein the tested electrical equipment is placed on the bottom surface of the main test chamber, comprising:

Step S3-1, calculating a transmission scattering coefficient $$\sigma_\lambda^{tr} = \frac{0.75 f_v Q_s^{tr}}{\bar{a}},$$

in this formula, $$Q_s^{tr}$$

represents a scattering transmission efficiency factor, when $$\bar{a} \leq 1 \ \mu m, Q_s^{tr} = 0.37,$$

when $$1 \ \mu m < \bar{a} < 3 \ \mu m, Q_s^{tr} = 0.35,$$

$$\text{when } 3 \ \mu m \leq \bar{a} < 5 \ \mu m, Q_s^{tr} = 0.32, \text{ when } \bar{a} \geq 5 \ \mu m,$$

$$Q_s^{tr} = 0.3;$$

Step S3-2, calculating the UV radiation intensity $q_t$ at the target position of the tested electrical equipment according to following formulas:

$$q_t = I_{inc}^{dir} T_{dir-h} + I_{inc}^{dif} T_{dif-h},$$

$$T_{dir-h} = \mu_i \frac{\mu_i(1 - E_{tr}) + (1 + E_{tr})/2}{1 + \tau_{tr}^2},$$

$$T_{dif-h} = \frac{1}{1 + \tau_{tr}^o},$$

$$\tau_{tr}^o = \beta_{tr}d = (\alpha_\lambda + \sigma_\lambda^{tr})d,$$

$$E_{tr} = \exp(-\tau_{tr}^o/\mu_i).$$

In these formulas, $T_{dir-h}$ and $T_{dif-h}$ respectively represent a directional hemispherical transmittance and a hemispherical diffusion transmittance, $\alpha_\lambda$ is an incidence angle of the parallel UV light on a salt spray droplet layer, and $\alpha_\lambda$ is 0°, $\mu_i$ is a cosine value of the incident angle $$\alpha_\lambda, \tau_{tr}^o$$

is a total optical thickness of the salt spray droplet layer, d is a distance between the target position of the tested electrical equipment and the coplanar surface of each UV fluorescent lamp tube, $\beta_{tr}$ represents an extinction coefficient, and $E_{tr}$ is an intermediate parameter.

7. The radiation intensity prediction method for the hot and humid marine environment simulation equipment according to claim 6, further comprising Step S4, which is based on a difference between the UV radiation intensity $q_t$ calculated in step S3 and a target UV radiation intensity, adjusting the UV radiation intensity $q_t$ at the target position of the tested electrical equipment to the target UV radiation intensity by correspondingly enhancing or weakening a luminous intensity of each UV fluorescent lamp tube.

* * * * *